C. E. POPE.
APPARATUS FOR BAKING PLATES AND OTHER USES.
APPLICATION FILED SEPT. 4, 1912.
1,124,168.
Patented Jan. 5, 1915.
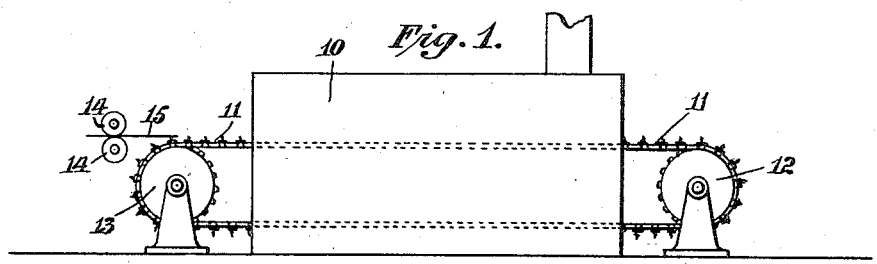
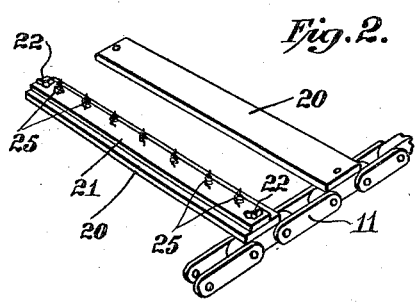
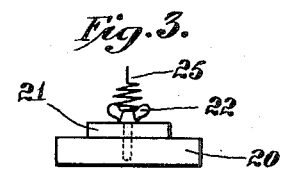
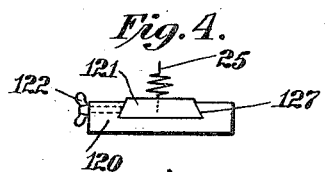
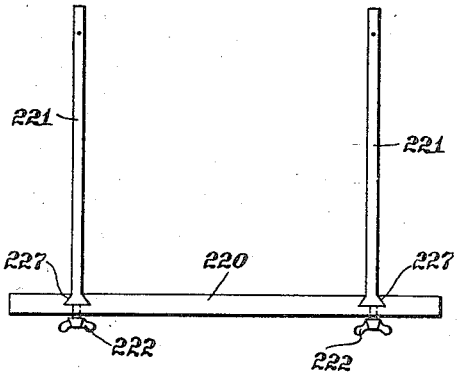
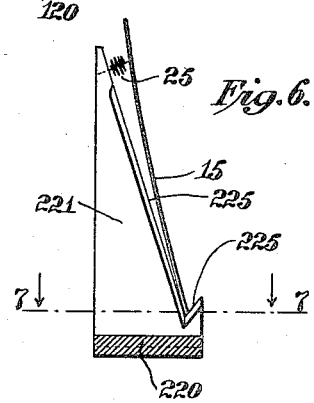
Attest:
Charles E. Pope, Inventor:
by Binney & Mastick
his Attys.

UNITED STATES PATENT OFFICE.

CHARLES E. POPE, OF PITTSBURGH, PENNSYLVANIA.

APPARATUS FOR BAKING PLATES AND OTHER USES.

1,124,168.   Specification of Letters Patent.   Patented Jan. 5, 1915.

Application filed September 4, 1912. Serial No. 718,501.

*To all whom it may concern:*

Be it known that I, CHARLES E. POPE, a resident of Pittsburgh, Pennsylvania, have invented certain new and useful Improvements in Apparatus for Baking Plates and other Uses, of which the following is a specification, accompanied by drawings.

The apparatus is particularly designed for exposing plates lacquered on both sides to baking temperature and carrying them while supported upon small or sharp supports through the baking chamber, but it is also applicable to carrying tubes and other bodies, as will be presently understood.

It is desirable to receive the plates or other articles from the coating devices in such a way and to carry them in such a way through the oven that the coating shall not become scratched or injured and that no considerable area shall be in contact with the supports.

The present invention in its best form provides means for receiving and carrying the articles through the oven upon sharp supports, some or all of which can yield and adjust themselves in receiving the coated articles so as not to scratch or substantially injure the coating.

In many respects the present invention forms an improvement upon apparatus more broadly claimed in my pending application filed August 7th, 1912, Number 713,795.

In the drawings, Figure 1 is a side view, partly diagrammatic, showing a baking oven, conveying apparatus and coating rolls embodying the present invention; Fig. 2 is a detail view of certain features of the conveying apparatus; Fig. 3 is another detail view; Fig. 4 is a view of another embodiment of the invention; Fig. 5 is a view of certain details of another form of the invention; Fig. 6 is a side view of Fig. 5, partly in section; and Fig. 7 is a horizontal section on the line 7—7 of Fig. 6.

In the drawings, Fig. 1 shows a baking oven 10, through which runs an endless conveyer, the conveying device 11 of which passes around the sprocket wheels 12 and 13 at either end and is suitably supported within the oven 10. At 14 are diagrammatically shown the coating and delivering rolls of apparatus for coating plates 15 with lacquer on both sides and delivering the same to the conveyer 11. For carrying plates in horizontal position through the oven, this conveyer has preferably the details of construction shown in Figs. 2 and 3. To each of the cross bars 20 secured to the chains of the conveyer 11 is detachably fastened a removable carrier 21 provided with a row of spiral resilient pin supports 25, which are preferably substantially sharp at their upper supporting end and are screw-threaded into the carriers 21. These carriers 21 are conveniently fastened to the cross bars 20 by the winged screws 22. The yielding sharp pin supports 25 are set so that their supporting points lie in a common plane in the upper side of the conveyer, as will be clear from Figs. 1 and 2, and receive the lacquered plates, which should, of course, be passed on to them from the rolls 14 at the same speed at which the conveyer travels. Consequently, if there is any slight movement between the plates 15 and the pin supports 25, the latter can yield and automatically adjust themselves so as to permit such slight movement of the plates without scraping or scratching the lacquered surface. If the pin supports 25 become clogged with lacquer so as to need cleaning, or if it is desired to remove them for any other purpose, the entire carrier 21 can be taken off as a unit and readily replaced.

In Fig. 4, carriers 121 sliding and secured in an undercut groove 127 in the cross bar 120 are shown, further secured by a winged set screw 122, if desired.

Obviously also other variations of the invention may readily be made.

In Figs. 5, 6 and 7, provision is made for receiving and supporting the plates 15 upon one edge in a nearly vertical position. Each cross bar 220 of the conveyer is, in this form, provided with two upright carriers 221 fitting into dovetail slots 227 in the cross bar 220, and tightly held, if need be, by the winged set screws 222. Each of these carriers is provided toward its lower end with knife edges 225 meeting in a V-shaped notch for receiving the extreme lower edge of the plate without injuring the surface of the plate. Toward the upper end, each carrier 225 is provided with a yielding pin support 25, like those already described. With this form of the improvement, the plates 15 are delivered downward from above, and as their lower edges reach the notch between the edges 225, the upper portion of the plate is allowed to fall or come against the pin supports 25, which, as before described, yield sufficiently to adjust themselves without scratching the lacquered surface.

It will be seen that the invention not only provides means for receiving the articles and allowing the points of support to adjust themselves slightly in the act of receiving, but also provides ample adjustment of the supports for the expansive movements of the plates or other articles under the heating effects of the oven. Also, the resilience of the supports tends to prevent injury of the coating by the trembling or vibration of the conveyer, if such occur, as is apt to be the case where the conveyers are neglected or are of inferior design.

I claim and desire to secure the following:

1. In combination, an endless flexible conveying device, a plurality of carriers separable from and carried by the said conveying device, and a plurality of sharp supports upon each of the said carriers, the said sharp supports being located in coöperating positions adapted to jointly support, without penetration and at a plurality of points, an article resting lightly thereon, and means for rigidly securing and releasing the several carriers to and from the conveying device.

2. In combination, an endless flexible conveying device, a plurality of carriers separable from and carried by the said conveying device, and a plurality of sharp supports upon each of the said carriers, the said sharp supports being located in coöperating positions adapted to jointly support, without penetration and at a plurality of points, an article resting lightly thereon and bearing simultaneously on the supports of a plurality of the carriers, and means for attaching and detaching the individual carriers.

3. In combination, an endless flexible conveying device, a plurality of sharp supports mounted thereon in positions to coöperate in jointly supporting an article laid thereon, without penetration, at a plurality of points simultaneously, said supports having means for permitting their relative yielding and adjustment under the weight of the article.

4. In combination, an endless flexible conveying device, a plurality of sharp supports mounted thereon in positions to coöperate in jointly supporting an article laid thereon, without penetration, at a plurality of points simultaneously, some of said supports being yielding and adapted to be self-adjusting in coöperating with other supports in jointly supporting an article.

5. In combination, an endless flexible conveying device, a plurality of sharp supports mounted thereon in positions to coöperate in jointly supporting an article laid thereon, without penetration, at a plurality of points simultaneously, some of the said supports embodying springs of a strength adapting them to a yielding and automatic coöperative adjustment in jointly supporting such article.

6. In combination, an endless flexible conveying device, a plurality of sharp supports mounted thereon in positions to coöperate in jointly supporting an article laid thereon, without penetration, at a plurality of points simultaneously, disposed in substantially the same common plane, and some of the said supports being yielding relative to the other coöperating supports under the weight of the article.

7. A conveying device having a plurality of yielding and substantially sharp supports set in positions to coact jointly on the same article to be supported and adapted to adjust themselves relatively in bearing loosely on a plurality of points of a single article.

In testimony whereof I have signed this specification in the presence of two subscribing witnesses this 29th day of August, 1912.

CHARLES E. POPE.

Witnesses:
J. E. DAUM,
M. J. RUSE.